(12) United States Patent
Andrews

(10) Patent No.: US 6,686,915 B2
(45) Date of Patent: Feb. 3, 2004

(54) SYSTEMS AND METHODS FOR RENDERING VISUAL EFFECTS THAT ARE A FUNCTION OF DEPTH

(75) Inventor: Jeffrey A. Andrews, Sunnyvale, CA (US)

(73) Assignee: Webtv Networks, Inc., Mountain View, CA (US)

(*) Notice: Subject to any disclaimer, the term of this patent is extended or adjusted under 35 U.S.C. 154(b) by 263 days.

(21) Appl. No.: 09/838,624

(22) Filed: Apr. 19, 2001

(65) Prior Publication Data

US 2002/0154135 A1 Oct. 24, 2002

(51) Int. Cl.[7] .............................................. G06T 15/40
(52) U.S. Cl. ........................................ 345/422; 345/426
(58) Field of Search ................................. 345/421, 419, 345/426, 581, 589, 592, 422

(56) References Cited

U.S. PATENT DOCUMENTS

| | | | | | |
|---|---|---|---|---|---|
| 5,357,579 A | * | 10/1994 | Buchner et al. | ........ | 345/426 X |
| 5,867,166 A | * | 2/1999 | Myhrvold et al. | .......... | 345/419 |
| 6,268,861 B1 | * | 7/2001 | Sanz-Pastor et al. | ........ | 345/426 |
| 6,348,919 B1 | * | 2/2002 | Murphy | ....................... | 345/421 |

OTHER PUBLICATIONS

Lokovic, T. & Veach, E., "Deep Shadow Maps", Pixar Animation Studios, SIGGRAPH 2000, ACM 2000, pp. 385–392.*

* cited by examiner

Primary Examiner—Matthew Luu
(74) Attorney, Agent, or Firm—Workman Nydegger

(57) ABSTRACT

Systems and methods for accurately and realistically rendering a visual effect such as fog, colored liquids, gels, smoke, mists, and the like for which the visual appearance of the effect can change with respect to depth and for which the effect is rendered on a output display so as to be generally contained. Depth values are identified and passed to a visibility function in order to yield corresponding visibility values. An adjusted visibility function blends the obtained visibility values and yields an adjusted visibility value. This process for obtaining an adjusted visibility value is performed for every pixel of a display screen that is used to render the visual effect in order to accurately render the visual effect as it would be perceived in the real world.

30 Claims, 5 Drawing Sheets

SYSTEMS AND METHODS FOR RENDERING VISUAL EFFECTS THAT ARE A FUNCTION OF DEPTH

BACKGROUND OF THE INVENTION

1. The Field of the Invention

The present invention relates to systems and methods for rendering visual effects that are a function of depth. More specifically, the present invention is directed to systems and methods for accurately and realistically rendering visual effects such as fog, colored liquids, gels, smoke, mists, and the like for which the visual appearance of the effects can change with respect to depth and for which the effects are rendered on an output device so as to be generally contained.

2. Background and Related Art

Computer systems exist that are capable of generating and displaying three-dimensional objects through the use of an output device, such as a monitor or printer. The output device provides a two-dimensional space on which the three-dimensional objects are displayed. The three-dimensional objects are created using an X-Y scale to provide the objects with the properties of width and height, and an imaginary Z-axis to further provide the property of depth. On the X-Y-Z scale, a rendering pipeline models the objects through the use of primitives or polygons that provide the overall structure for the objects and upon which textures, such as color and shade, may be applied.

Conventional rendering techniques add visual effects to computer graphics to provide realism. The visual effects may utilize depth by layering an opaque object in such a way as to partially hide another object that is behind the opaque object so as to give the appearance of depth. The visual effects may also utilize depth by rendering an opaque object through a partially transparent or translucent item, such as when fog or mist is rendered to surround an opaque object.

To render a partially transparent or translucent visual effect, such as fog, mist, haze, colored liquid, etc., conventional rendering techniques utilize a linear or exponential algorithm that renders visibility as a function of depth. By way of example, and with reference to FIG. 1A, a visibility curve 10 is illustrated that corresponds to an algorithm for rendering a partially transparent or translucent visual effect. The curve divides the visibility that may be rendered due to a partially transparent or translucent visual effect into three visibility regions. The visibility regions include transparent region 11a, partially transparent region 11b, and opaque region 11c, which model the way that objects are perceived in the real world.

When a partially transparent or translucent visual effect is to be rendered on an output device so as to appear to surround an opaque object, the viewpoint, or camera, 12 is placed at the vertical axis (i.e., depth=0), and the opaque object 13 is placed at some depth along the horizontal depth axis. The rendering of the visual effect is performed by projecting a point, such as a front primitive point of opaque object 13 onto the visibility curve 10 to obtain a visibility value (i.e. 0.4), which indicates the amount of the transparent or translucent effect that is to be blended to the front primitive point. This process is performed for each of the pixels in order to render the desired effect, as illustrated in FIG. 1A as object 13b of display screen 15b. As illustrated, when the visibility value is between 0.0 (completely opaque) and 1.0 (completely transparent) the object is rendered as being partially transparent, as illustrated by object 13b. The surrounding background 14b is rendered to have a greater depth value than object 13b and thus the background 14b is illustrated as being completely opaque Therefore, the foregoing process partially obscures opaque object 13b when the opaque object is positioned in the partially transparent region 11b.

Alternatively, if the opaque object were placed within the transparent region 11a, the points projected onto visibility curve 10 would obtain a visibility value of 1.0 for all of the projected points of the object, indicating that there is full visibility of the opaque object. As such, an output device would render the opaque object without rendering any of the visual effect. This is illustrated in FIG. 1A as opaque object 13a that is rendered on display screen 15a. However, since the surrounding background 14a is rendered to have a greater depth value than object 13a, background 14a is illustrated as being completely opaque. Thus, the foregoing process does not obscure an object 13a that is positioned in the transparent region 11a.

If the opaque object were placed within the opaque region 11c, the points projected onto visibility curve 10 would yield a visibility value of 0.0 for all of the projected points of the object, indicating that there is no visibility of the opaque object. As such, the visibility of the opaque object would be completely obscured. An output device would render the visual effect in a maximum/opaque manner, thereby preventing the rendering of the opaque object. This is illustrated in FIG. 1A as display screen 15c, which includes background 14c that is also opaque due to depth. Therefore, the foregoing process completely obscures an object that is positioned in the opaque region 11c.

Thus, as illustrated in FIG. 1A, the extent to which a partially transparent or translucent visual effect is rendered varies with depth. The linear or exponential algorithm applies the effect to the primitives having a depth value between where the effect is to start and where effect is to end. No effect is applied to primitives having a depth value less than where the effect is to start in order to yield full visibility. Similarly, a maximum effect is applied to primitives having a depth value greater than where the effect is to end in order to completely obscure visibility.

While conventional techniques adequately render the desired perception where the visual effect linearly or exponentially exists in the entire field of view, existing techniques have not been able to accurately render the situation where the visual effect is generally contained to a specific area. Such situations arise when the visual effect is present, for example, within a translucent object, such as when fog or colored liquid is to be rendered inside an enclosed glass bottle.

By way of example, and with reference to FIG. 1B, if an opaque object 13 in a translucent bottle 18, which is filled with colored liquid (not shown), were to be rendered using existing techniques, the following steps would occur. First, the primitive on the visible surface of the opaque object 13 would be applied to the frame buffer under the assumption that the colored liquid exists between the primitive and the viewpoint 17. Next, a primitive at the front surface of the translucent bottle 18 would be applied to the same pixel of the frame buffer.

This process generates an excess contribution of the translucent visual effect (the colored liquid) that is applied to the primitive on the visible surface of object 13 since there is no colored liquid that is to be rendered between the front of the translucent bottle 18 and the viewpoint 17. Furthermore, since the primitive of the front surface of the opaque object has already been blended into the pixel value stored in the frame buffer, there is no convenient way of subtracting the excess contribution of the translucent effect.

Furthermore, this problem cannot be fully solved by subtracting the depth value of the opaque object from the depth value of the translucent bottle prior to generating the translucent effect value, since the translucent effect is generally not linear between the viewpoint 17 and the object 13. By way of example, and with reference to FIG. 1B, the depth value of the front surface of opaque object 13 is a known value and is illustrated as "$DEPTH_1$." Similarly, the depth value of the front surface of the translucent bottle 18 is a known value and is illustrated as "$DEPTH_2$." The difference ($\Delta D$) between the depth value of the front surface of the opaque object 13 and the depth value of the front surface of the translucent bottle 18 can be obtained by subtracting $DEPTH_2$ from $DEPTH_1$. Applying the value of $\Delta D$ to the visibility curve 10 renders a visibility value of 1.0 for $\Delta D$, which renders full visibility of opaque object 13. Therefore, subtracting $DEPTH_2$ from $DEPTH_1$ does not model the visibility of opaque object 13 in the manner in which it would be perceived in the real world, since the visibility of opaque object 13 is not diminished according to the foregoing technique.

Thus, while conventional techniques can adequately render the desired perception of a partially transparent or translucent visual effect that linearly or exponentially exists in the entire field of view, the existing techniques are not able to accurately render the situation where the visual effect is generally contained to a specific area.

SUMMARY OF THE INVENTION

The present invention relates to systems and methods for rendering visual effects that are a function of depth. More specifically, the present invention is directed to systems and methods for accurately and realistically rendering visual effects such as fog, colored liquids, gels, smoke, mists, and the like for which the visual appearance of the effects can change with respect to depth and for which the effects are rendered on an output device so as to be generally contained.

Implementation of the present invention takes into account the distance of the primitive from the viewer, the depth of the segment of the visual effect that is to be applied to the primitive, and the non-linearity of the visual effect function. A visibility curve is utilized to obtain visibility values for a given pixel based on the depth at which the segment of the visual effect begins and ends. Once obtained, the visibility values are passed to an adjustment function in order to yield an adjusted visibility value that is applied to the pixel. This process of obtaining visibility values, passing the visibility values to an adjustment function to obtain an adjusted visibility value, and applying the adjusted visibility value to a pixel, is performed for every pixel of a display screen that is to be used to accurately render a desired visual effect that can change with respect to depth and for which the effect is rendered on a display screen so as to be generally contained.

In contrast to obtaining a difference ($\Delta D$) between the depth value at which the segment of the visual effect begins and the depth value at which it ends (e.g, the front surface of the opaque object) prior to obtaining visibility values, implementation of the present invention includes applying these two depth values to the visibility curve to obtain two visibility values associated with the visual effect and then identifying the difference between the resulting two visibility values. By way of example, to render an opaque object within a bottle that is filled with colored liquid in accordance with the present invention, a depth value of the front surface of the translucent bottle is applied to a visibility curve to obtain a corresponding visibility value for the front surface of the translucent bottle. Similarly, a depth value of the front surface of the opaque object is applied to the visibility curve to obtain a corresponding visibility value for the front surface of the opaque object. The visibility values for the front surface of the translucent bottle and for the front surface of the opaque object are passed to an adjusted visibility function, where the difference between the two visibility values is used as the basis for an adjusted visibility value. The adjusted visibility value is a factor applied to the luminous intensity values associated with the pixel to decrease the visibility of the opaque object. Calculating the adjusted visibility value in the foregoing manner results in a rendered image that models the way that the visual effect, which can change with respect to depth and for which the effect is generally contained, would be perceived in the real world.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE INVENTION

The present invention relates to systems and methods for rendering visual effects that are a function of depth. More specifically, the present invention is directed to systems and methods for accurately and realistically rendering visual effects such as fog, colored liquids, gels, smoke, mists, and the like for which the visual appearance of the effects can change with respect to depth and for which the effects are rendered on an output device so as to be generally contained.

The embodiments of the present invention may comprise a special purpose or general purpose computer including various computer hardware for rendering three-dimensional graphics, as will be discussed in greater detail below. Set top boxes that enhance the capabilities of conventional televisions represent an example of a special purpose computer. Examples of a general purpose computer include a personal computer, a laptop computer, and any other such computer capable of rendering partially transparent or translucent visual effects that change with respect to depth and for which the effects are rendered on an output device so as to be generally contained.

Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions.

Exemplary Operating Environment

Figure 2:
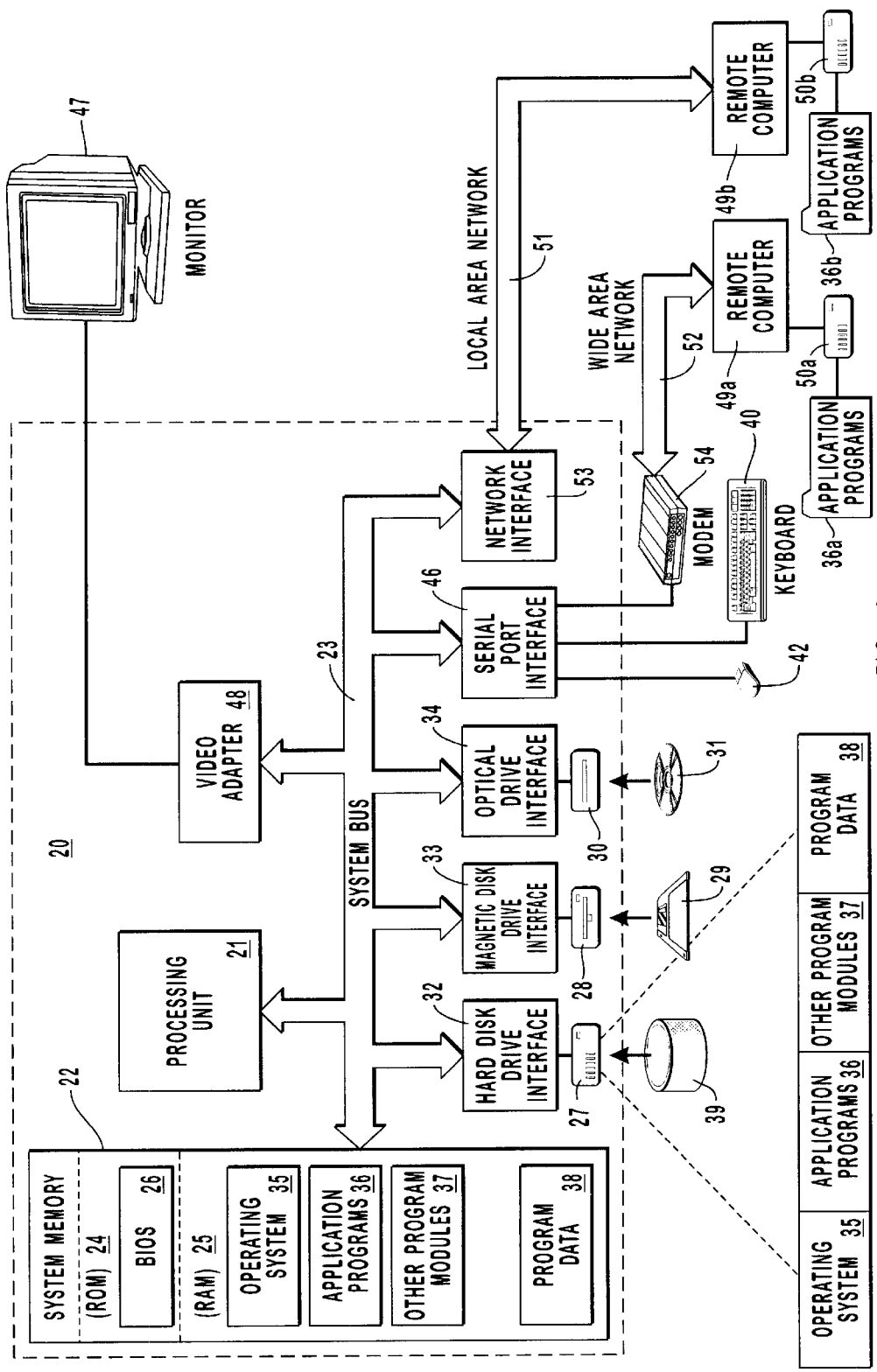
FIG. 2 illustrates an exemplary system that provides a suitable operating environment for the present invention.

FIG. 2 and the following discussion are intended to provide a brief, general description of a suitable computing environment in which the invention may be implemented. Although not required, the invention will be described in the general context of computer-executable instructions, such as program modules, being executed by computers in network environments. Generally, program modules include routines, programs, objects, components, data structures, etc., which perform particular tasks or implement particular abstract data types. Computer-executable instructions, associated data structures, and program modules represent examples of the program code means for executing steps of the methods disclosed herein. The particular sequence of such executable instructions or associated data structures represent examples of corresponding acts for implementing the functions described in such steps.

Those skilled in the art will appreciate that the invention may be practiced in network computing environments with many types of computer system configurations, including personal computers, hand-held devices, multi-processor systems, microprocessor-based or programmable consumer electronics, network PCs, minicomputers, mainframe computers, and the like. The invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

With reference to FIG. 2, an exemplary system for implementing the invention includes a general purpose computing device in the form of a conventional computer 20, including a processing unit 21, a system memory 22, and a system bus 23 that couples various system components including the system memory 22 to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system (BIOS) 26, containing the basic routines that help transfer information between elements within the computer 20, such as during start-up, may be stored in ROM 24.

The computer 20 may also include a magnetic hard disk drive 27 for reading from and writing to a magnetic hard disk 39, a magnetic disk drive 28 for reading from or writing to a removable magnetic disk 29, and an optical disk drive 30 for reading from or writing to removable optical disk 31 such as a CD-ROM or other optical media. The magnetic hard disk drive 27, magnetic disk drive 28, and optical disk drive 30 are connected to the system bus 23 by a hard disk drive interface 32, a magnetic disk drive-interface 33, and an optical drive interface 34, respectively. The drives and their associated computer-readable media provide nonvolatile storage of computer-executable instructions, data structures, program modules and other data for the computer 20. Although the exemplary environment described herein employs a magnetic hard disk 39, a removable magnetic disk 29 and a removable optical disk 31, other types of computer readable media for storing data can be used, including magnetic cassettes, flash memory cards, digital versatile disks, Bernoulli cartridges, RAMs, ROMs, and the like.

Program code means comprising one or more program modules may be stored on the hard disk 39, magnetic disk 29, optical disk 31, ROM 24 or RAM 25, including an operating system 35, one or more application programs 36, other program modules 37, and program data 38. A user may enter commands and information into the computer 20 through keyboard 40, pointing device 42, or other input devices (not shown), such as a microphone, joy stick, game pad, satellite dish, scanner, or the like. These and other input devices are often connected to the processing unit 21 through a serial port interface 46 coupled to system bus 23. Alternatively, the input devices may be connected by other interfaces, such as a parallel port, a game port or a universal serial bus (USB). A monitor or another display device is also connected to system bus 23 via an interface, such as video adapter 48. In addition to the monitor, personal computers typically include other peripheral output devices (not shown), such as speakers and printers.

Video adapter 48 generally provides computer 20 with display capabilities, which depend on the logical circuitry provided in video adapter 48 and the capabilities of monitor 47. A video adapter 48 generally provides several different video modes for both text and graphics. In text mode monitor 47 can display only ASCII characters, but in graphics mode monitor 47 can display any bitmapped image. A video adapter 48 may include memory (not shown) so that RAM 25 is not used for storing text and/or graphic displays. Furthermore, a video adapter 48 may include a graphics co-processor (not shown) for performing graphics calculations.

The computer 20 may operate in a networked environment using logical connections to one or more remote computers, such as remote computers 49a and 49b. Remote computers 49a and 49b may each be another personal computer, a server, a router, a network PC, a peer device or other common network node, and typically include many or all of the elements described above relative to the computer 20, although only memory storage devices 50a and 50b and their associated application programs 36a and 36b have been illustrated in FIG. 2. The logical connections depicted in FIG. 2 include a local area network (LAN) 51 and a wide area network (WAN) 52 that are presented here by way of example and not limitation. Such networking environments are commonplace in office-wide or enterprise-wide computer networks, intranets and the Internet.

When used in a LAN networking environment, the computer 20 is connected to the local network 51 through a network interface or adapter 53. When used in a WAN networking environment, the computer 20 may include a modem 54, a wireless link, or other means for establishing communications over the wide area network 52, such as the Internet. The modem 54, which may be internal or external, is connected to the system bus via the serial port interface 46. In a networked environment, program modules depicted relative to the computer 20, or portions thereof, may be stored in the remote memory storage device. It will be appreciated that the network connections shown are exemplary and other means of establishing communications over wide area network 52 may be used.

While the exemplary system for implementing the present invention illustrated in FIG. 2 includes a general purpose computing device in the form of a conventional computer, those skilled in the art will appreciate that the present invention may be practiced in a variety of different systems for rendering three-dimensional graphics. For example, another system for implementing the present invention includes a special purpose computer in the form of a WebTV® set-top box or similar Internet terminal that has been adapted to perform operations that include composing, sending and receiving email, browsing the World Wide Web ("Web"), accessing other segments of the Internet, and otherwise displaying information.

Rendering Visual Effects that are a Function of Depth

As provided above, embodiments of the present invention relate to rendering visual effects that can at least partially reduce the visibility of objects in a field of view. The visual effects associated with the invention have visual appearances that change with respect to depth or that are rendered on a display device or printed on an output device so as to be generally contained. Examples of such visual effects that are a function of depth include, but are not limited to, fog, colored liquids, gels, smoke, mists, and the like. In rendering the visual effects, the present invention takes into account the distance of the primitive from the viewer, the depth of the segment of the visual effect that is to be applied to the primitive, and the non-linearity of the visual effect function. Embodiments of the present invention are particularly applicable for rendering scenes in which the fog or other visual effect exists in specific regions, such as within a closed container, within a room visible through a window or an open door, in landscapes having patchy fog or haze, etc. As used herein, the term "generally contained" refers to a visual effect that is applied over a region less than the entire distance between the viewpoint and an object whose appearance is modified by the visual effect.

When a partially transparent or translucent visual effect, which can change with respect to depth and for which the effects are rendered on a display device so as to be generally contained, is to be rendered on a display device, one or more pipelines are used to obtain visibility values. As will be further explained below, once obtained, the visibility values are passed to an adjusted visibility function to obtain an adjusted visibility value that is used to render the partially transparent or translucent visual effect. In one embodiment, a plurality of pipelines are used to obtain the visibility values. In another embodiment, multiple passes are performed on a single pipeline to obtain the visibility values, as will be further explained below.

Figure 3:
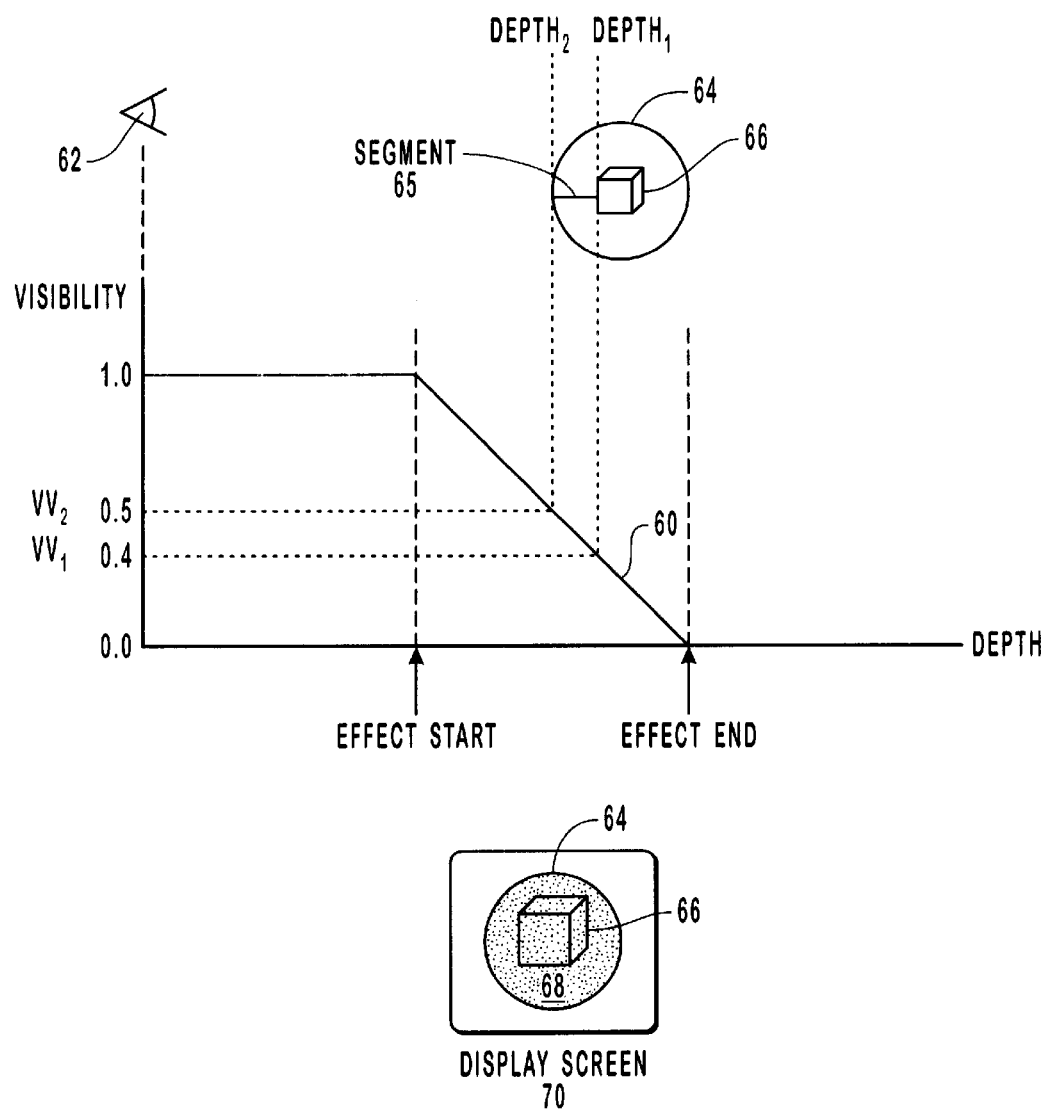
FIG. 3 illustrates an exemplary embodiment for accurately rendering a visual effect that is generally contained and is a function of depth.

With reference to FIG. 3, a visibility curve 60 is illustrated that corresponds to a linear or exponential algorithm for a visual effect. The visibility curve 60 is utilized in accordance with the present invention to render a partially transparent or translucent visual effect for which the visual appearance of the effect can change with respect to depth and for which the effects are rendered on a display device or other output device, such as a printer, so as to be generally contained. One such example would include rendering an opaque object 66 within a transparent glass sphere 64, wherein the glass sphere is filled with a colored liquid. As such, the colored liquid has a visual appearance that can change with respect to depth and is to be rendered on a display device so as to be generally contained within the glass sphere 64. In this example, the visual effect is generally contained in the sense that it extends over only a segment of the distance between the viewpoint 62 and the opaque object 66 rather than over the entire distance therebetween.

A viewpoint 62 is placed at the vertical axis (i.e. depth=0) and visibility values are obtained. The visibility values represent factors used to adjust the visibility of a primitive associated with opaque object 66 based on the degree to which the visual effect is present. A visibility value of 1.0 results in no diminished visibility of the primitive, while a visibility value of 0.0 fully obscures the primitive. A first depth value (illustrated in FIG. 3 as $DEPTH_1$) is identified for a first point of the primitive that represents the front surface of the opaque object 66 and is projected onto the visibility curve 60 to obtain a visibility value for a pixel that is used to render the effect. In the present example, the visibility value obtained for the first depth value is 0.4. A second depth value (illustrated in FIG. 3 as $DEPTH_2$) is identified for a first point of a primitive that represents the front surface of glass sphere 64. The point corresponds to the same pixel of a display screen that was referred to above and is projected onto visibility curve 60 to obtain a visibility value. In the illustrated example, the visibility value obtained for the second depth value is 0.5.

As provided above, the visibility values can be obtained in a variety of manners. In one embodiment, a plurality of pipelines are used to obtain the visibility values. In another embodiment, a plurality of passes are performed on a single pipeline to obtain the visibility values. Once obtained, the visibility values are passed to an adjusted visibility function to obtain an adjusted visibility value that is used to provide the accurate amount of the partially transparent or translucent visual effect that is to be applied to luminous intensity values associated with the primitive of the front surface of opaque object 66, as will be further explained below.

Figure 4:
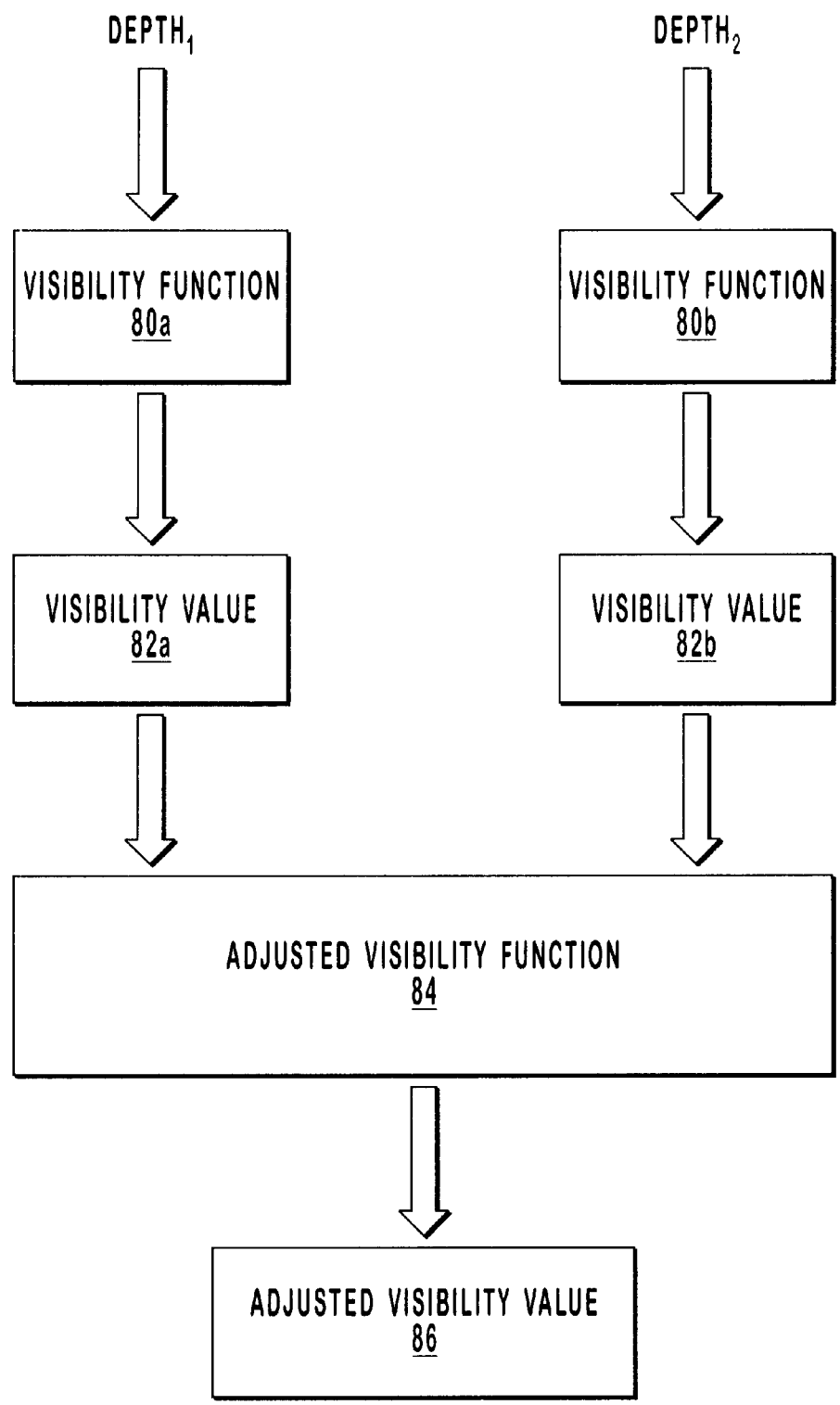
FIG. 4 illustrates the utilization of a plurality of rendering pipelines that are used in parallel to accurately render a visual effect that is generally contained and is a function of depth, in accordance with the embodiment of FIG. 3.

With reference to FIG. 4, two parallel pipelines are illustrated for purposes of the present example. In FIG. 4, a first depth value (DEPTH$_1$) is identified and passed down a first pipeline, which includes visibility function 80a. The visibility function 80a corresponds to the visibility curve 60 of FIG. 3. The passing of the first depth value (DEPTH$_1$) to visibility function 80a yields visibility value 82a, which corresponds to the first depth value (DEPTH$_1$) and in FIG. 3 has a visibility value (VV$_1$) of 0.4. Likewise, a second depth value (DEPTH$_2$) is identified and passed down a second pipeline, which includes visibility function 80b. The visibility function 80b also corresponds to the visibility curve 60 of FIG. 3, meaning that visibility function 80a and visibility function 80b are based on the same visibility curve. The passing of the second depth value (DEPTH$_2$) to the visibility function 80b yields visibility value 82b, which corresponds to the second depth value (DEPTH$_2$) and in FIG. 3 has a visibility value (VV$_2$) of 0.5.

As provided above, in a separate embodiment, successive passes are performed on a single pipeline to obtain the visibility values. As such, a first depth value is identified and passed to a visibility function in order to obtain a first visibility value that is temporarily buffered. A second depth value is identified and passed to the visibility function in order to obtain a second visibility value. While the examples above reference obtaining two visibility values, embodiments of the present invention also embrace obtaining more than two visibility values for a given pixel of a display screen. By way of example, multiple objects where each contains a partially transparent or translucent effect may contribute to a given pixel. Thus, the dual effect value lookup process may be performed multiple times to completely render the single pixel. As another example, the effect values that are looked up in a table are (i) greater than or equal to the desired result and (ii) less than or equal to the desired result, for each of the two visibility results. A process of interpolation is then performed between the two values to give a more effective resolution to the table. As such, the information contained in the table is minimized.

Whether one pipeline or a plurality of pipelines are used to obtain the visibility values, an adjusted visibility function is utilized to blend the visibility values for a pixel and to yield an adjusted visibility value that is applied to the pixel in order to accurately render the partially transparent or translucent effect. In FIG. 4, visibility values 82a and 82b respectively correspond to VV$_1$ and VV$_2$ of FIG. 3 and are applied to an adjusted visibility function 84 to obtain an adjusted visibility value 86. In one embodiment, the adjusted visibility value is based on a difference between the second visibility value and the first visibility value. Therefore, the adjusted visibility function 84, in accordance with one embodiment of the present invention, is illustrated as Equation 1 below.

Equation 1

ADJUSTED VISIBILITY VALUE=1.0−(Visibility Value$_2$−Visibility Value$_1$)

The adjusted visibility value corresponds to the generally contained visual effect that is rendered between the transparent object and the opaque object. Therefore, with reference back to FIG. 3, when the first depth value identified is the proximal surface of the opaque object 66 and the second depth value identified is the proximal surface of the glass sphere 64, the adjusted visibility value corresponds to the segment 65 that is rendered between the opaque object and the transparent sphere. Thus, the proximal end of the segment 65 corresponds to a point at the proximal surface of glass sphere 64. The distal end of the segment 65 corresponds to a point at the proximal surface of opaque object 66. Equation 2 below applies the visibility value of the present example to Equation 1 so as to obtain an adjusted visibility value.

Equation 2

ADJUSTED VISIBILITY VALUE=1.0−(0.5−0.4)=1.0−0.1=0.9

Figure 1A:
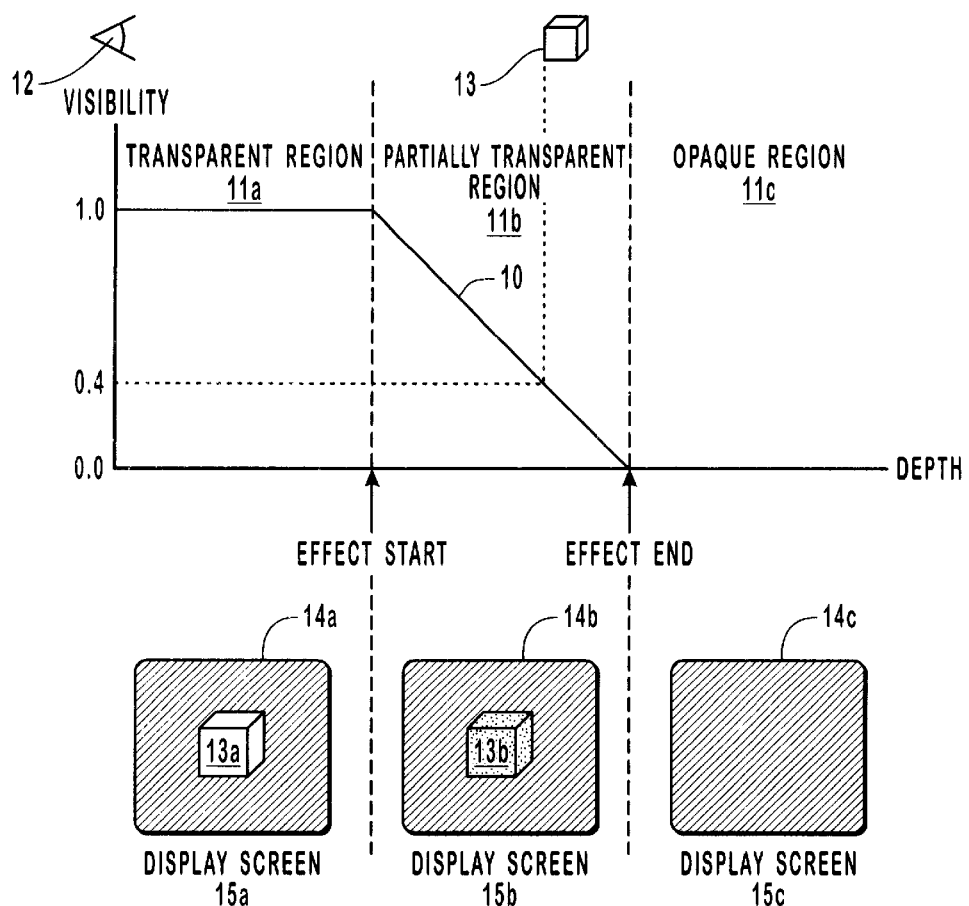
FIG. 1A illustrates a conventional technique for rendering a visual effect that is a function of depth.
Figure 1B:
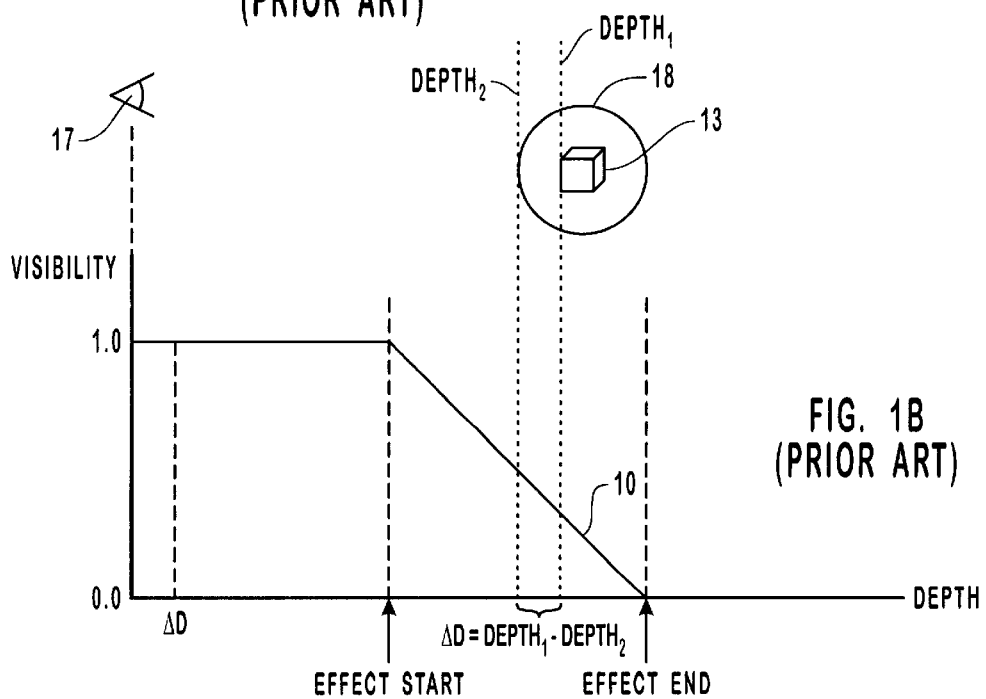
FIG. 1B illustrates a technique of applying a conventional rendering process to a visual effect that is generally contained and is a function of depth, which inadequately renders the visual effect.

As illustrated by Equation 2, the adjusted visibility function 84, as provided by Equation 1, yields an adjusted visibility value 86 of 0.9, as shown in Equation 2. The adjusted visibility value 86 is applied to the luminous intensity values associated with the front surface of opaque object 66 in order to accurately render the visual effect at that pixel. It is noted that, in this example, the usual effect existing over segment 65 partially obscures opaque object 66. In contrast, the inadequate alternate approach of subtracting DEPTH$_2$ from DEPTH$_1$, prior to obtaining the visibility value fails to obscure opaque object 66 at all, as shown above in reference to FIG. 1B.

The process of identifying depth values, obtaining visibility values, and utilizing an adjusted visibility function to obtain an adjusted visibility value for a given pixel is performed for every pixel that is associated with the visual effect in order to accurately render the desired effect. By way of example, when the process of obtaining an adjusted visibility value is used to render a scene partially composed of a transparent glass sphere having a colored liquid contained therein, the adjusted effect values obtained correspond to the pixels of the display device that are used to render the colored liquid. Therefore, with reference back to FIG. 3, once the forgoing rendering process is performed for all of the pixels of the display screen 70 that correspond to transparent glass sphere 64, the opaque object 66 is accurately rendered within transparent glass sphere 64 containing colored liquid 68.

Figure 5:
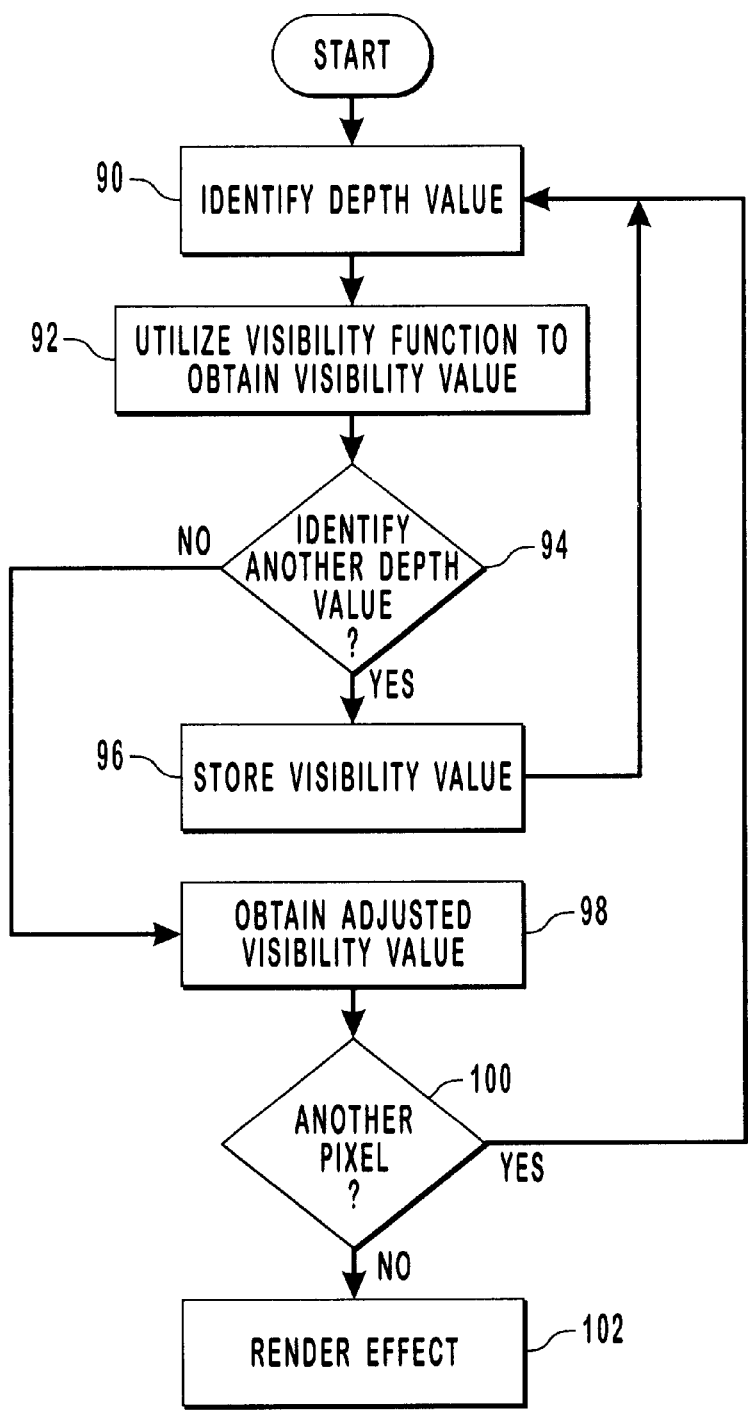
FIG. 5 illustrates a flow chart that utilizes a plurality of passes through a single rendering pipeline to accurately render a visual effect that is generally contained and is a function of depth, in accordance with the embodiment of FIG. 3.

With reference to FIG. 5, a flow chart is illustrated that provides an exemplary method for rendering visual effects for which the visual appearance of the effects can change with respect to depth and for which the effects are rendered on a display device so as to be generally contained.

In FIG. 5, when only one pipeline is used, execution begins at step 90 where a first depth value is identified that corresponds to a first pixel that will be used to render the effect on a display screen. At step 92, the depth value identified at step 90 is passed to a visibility function, which is utilized to obtain a corresponding visibility value. Execution then proceeds to decision block 94 for a determination as to whether or not another depth value is to be identified for a given pixel. As provided above, the rendering of a visual effect that is generally contained and is a function of depth requires the identification of two depth values. Therefore, if it is determined at decision block 94 that the second depth value for the pixel needs be identified, execution proceeds to step 96, where the first visibility value obtained at step 92 is stored in a temporary storage location and execution proceeds to step 90 to identify the second depth value. At step 92, the visibility function is utilized to obtain a second visibility value that corresponds to the second depth value. At step 92 it is determined that both depth values for the pixel have been identified and thus execution proceeds to step 98.

Alternatively, when two pipelines are used, each pipeline identifies a depth value and uses the depth value in a visibility function to independently obtain two visibility values. Execution then proceeds to step 98 of FIG. 5. At step 98 an adjusted visibility value for the current pixel is obtained. Generally, where only a single segment of the visual effect is present, as illustrated in FIG. 3, Equation 1 can be used to calculate the adjusted visibility value. Execution then proceeds to decision block 100 for a determination as to whether or not the process for obtaining an adjusted visibility value for a pixel is to be performed for another pixel of the display screen. If it is determined at decision block 100 that the process for obtaining an adjusted visibility value is to be performed for another pixel, execution returns backs to step 90 in order for the process to be performed for a new pixel. Once the process for obtaining an adjusted visibility value has been performed for every pixel of a display screen that corresponds to the particular object being rendered, decision block 100 determines that the process is not to be performed for another pixel of the display screen and execution proceeds to step 102 for rendering the effect on the display screen.

Thus, the present invention relates to systems and methods for accurately and realistically rendering visual effects for which the visual appearance of the effects can change with respect to depth and for which the effects are rendered on a display device or other output device so as to be generally contained. The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. In a rendering system for rendering an image that includes objects to which a visibility-reducing effect is applied, a method for applying to an object a segment of the visibility-reducing effect positioned between the object and a viewpoint, the method comprising the acts of:
   identifying:
      a first depth value representing a distance between a viewpoint and an object located, with respect to said viewpoint, at a distal end of the segment of the visibility-reducing effect that at least partially obscures said object; and
      a second depth value representing a distance between a proximal end of the segment and said viewpoint;
   generating a first visibility value by applying said first depth value to a first visibility function;
   generating a second visibility value by applying said second depth value to a second visibility function;
   generating an adjusted visibility value based on a difference between said second visibility value and said first visibility value; and
   applying said adjusted visibility value to said object prior to compositing image data associated with the object in a buffer.

2. A method as recited in claim 1, wherein said first visibility function corresponds to a first pipeline and said second visibility function corresponds to a second pipeline.

3. A method as recited in claim 2, wherein said first visibility function is linear or exponential between one depth at which the visibility-reducing effect begins to obscure the object and another depth at which the visibility-reducing effect fully obscures the object.

4. A method as recited in claim 3, wherein said second visibility function is linear or exponential between one depth at which the visibility-reducing effect begins to obscure the object and another depth at which the visibility-reducing effect fully obscures the object.

5. A method as recited in claim 1, wherein said second visibility function is said first visibility function, and wherein said first visibility function corresponds to a first pipeline.

6. A method as recited in claim 5, wherein said first visibility function is linear between one depth at which the visibility-reducing effect begins to obscure the object and another depth at which the visibility-reducing effect fully obscures the object.

7. A method as recited in claim 5, wherein said first visibility function is exponential between one depth at which the visibility-reducing effect begins to obscure the object and another depth at which the visibility-reducing effect fully obscures the object.

8. A method as recited in claim 1, wherein the visibility-reducing effect comprises the rendering of one of fog, smoke, and a mist.

9. A method as recited in claim 1, wherein the visibility-reducing effect is a function of depth.

10. In a rendering system for rendering an image on an output device, a method for rendering the image having a first object that is transparent or translucent and generally contains a second object and a visibility-reducing effect, wherein the visibility-reducing effect at least partially obscures the second object, the method comprising the acts of:
   identifying a first depth value representing a distance a between a viewpoint and the second object;
   identifying a second depth value representing a distance between said viewpoint and the first object, wherein the first object contains the second object and a visibility-reducing effect that at least partially obscures the second object;
   generating a first visibility value by applying said first depth value to a first visibility function;
   generating a second visibility value by applying said second depth value to a second visibility function that takes into account the visibility-reducing effect;
   generating an adjusted visibility value based on a difference between said second visibility value and said first visibility value; and
   applying said adjusted visibility value to the second object prior to compositing image data associated with the second object in a buffer, wherein said adjusted visibility value at least partially obscures the second object.

11. A method as recited in claim 10, wherein the visibility-reducing effect is a function of depth.

12. A method as recited in claim 10, wherein the output device includes at least one of a display screen and a printer.

13. A method as recited in claim 10, wherein the visibility-reducing effect comprises the modeling of at least one of fog, smoke, and a mist.

14. A method as recited in claim 10, wherein said first visibility function corresponds to a first pipeline and said second visibility function corresponds to a second pipeline.

15. A method as recited in claim 14, wherein said first visibility function comprises at least one of a linear portion and an exponential portion.

16. A method as recited in claim 14, wherein said second visibility function comprises at least one of a linear portion and an exponential portion.

17. A method as recited in claim 10, wherein said second visibility function is said first visibility function.

18. A method as recited in claim 17, wherein said first visibility function comprises at least one of a linear portion and an exponential portion.

19. In a rendering system that includes an output device, a method for rendering on the output device an image that includes a generally contained visibility-reducing effect, the method comprising the acts of:

using a first pipeline to perform the acts of:
identifying a first depth value representing a distance between a viewpoint and a distal end of a segment of the visibility-reducing effect; and
generating a first visibility value by applying said first depth value to a first visibility function;

using a second pipeline to perform the acts of:
identifying a second depth value representing a distance between a viewpoint and a proximal end of said segment of the visibility-reducing effect; and
generating a second visibility value by applying said second depth value to a second visibility function;

generating an adjusted visibility value based on a difference between said second visibility value and said first visibility value; and applying said adjusted visibility value to image data that represents the image that is rendered on the output device.

20. A method as recited in claim 19, wherein the output device includes at least one of a display screen and a printer.

21. A method as recited in claim 19, wherein the visibility-reducing effect comprises the modeling of at least one of fog, smoke, and a mist.

22. A method as recited in claim 19, wherein said first visibility function comprises at least one of a linear portion and an exponential portion.

23. A method as recited in claim 22, wherein said second visibility function comprises at least one of a linear portion and an exponential portion.

24. A computer program product for implementing in a computer system a method for applying to an object a segment of a visibility-reducing effect positioned between the object and a viewpoint of an image that is to be rendered on a display screen of the computer system, the computer program product comprising:

a computer readable medium carrying executable code that, when executed by the computer system, implements the acts of:
identifying:
a first depth value representing a distance between the viewpoint and an object located, with respect to said viewpoint, at a distal end of the segment of the visibility-reducing effect that at least partially obscures said object; and
a second depth value representing a distance between a proximal end of the segment and said viewpoint;
generating a first visibility value by applying said first depth value to a visibility function;
generating a second visibility value by applying said second depth value to said visibility function;
generating an adjusted visibility value based on a difference between said second visibility value and said first visibility value; and
applying said adjusted visibility value to said object prior to compositing image data associated with the object in a buffer.

25. A computer program product as recited in claim 24, wherein said visibility function comprises a linear portion.

26. A computer program product as recited in claim 24, wherein said visibility function comprises an exponential portion.

27. A computer program product as recited in claim 24, wherein the visibility-reducing effect is a function of depth to at least partially obscure said object.

28. A method as recited in claim 1, wherein the visibility-reducing effect comprises the rendering of one of a colored liquid and a gel.

29. A method as recited in claim 10, wherein the visibility-reducing effect comprises the rendering of one of a colored liquid and a gel.

30. A method as recited in claim 19, wherein the visibility-reducing effect comprises the rendering of one of a colored liquid and a gel.

* * * * *